(12) United States Patent
Shimizu (10) Patent No.: US 6,370,759 B1
(45) Date of Patent: Apr. 16, 2002

(54) APPARATUS FOR STRIPPING INSULATION FROM A WIRE

(76) Inventor: Tokichi Shimizu, 107-2, 2 Umedacho, Kiryu-Shi, Gunma-Ken (JP)

( * ) Notice: Subject to any disclaimer, the term of this patent is extended or adjusted under 35 U.S.C. 154(b) by 0 days.

(21) Appl. No.: 09/534,057

(22) Filed: Mar. 24, 2000

(30) Foreign Application Priority Data

Mar. 30, 1999 (JP) .......................................... 11-090332

(51) Int. Cl.$^7$ .......................... B23P 19/00; H02G 1/12; H01R 43/00
(52) U.S. Cl. ...................... 29/564.4; 29/33 M; 81/9.51
(58) Field of Search ............................. 29/564.4, 33 M; 81/9.51; 140/149; 30/90.1

(56) References Cited

U.S. PATENT DOCUMENTS

| | | | | |
|---|---|---|---|---|
| 3,816,915 A | * | 6/1974 | Bieganski | 30/90.1 |
| 3,838,612 A | * | 10/1974 | Inami | 81/9.51 |
| 3,951,016 A | * | 4/1976 | Gudmestad et al. | 81/9.51 |
| 4,019,409 A | * | 4/1977 | McKeever | 81/9.51 |
| 4,352,305 A | * | 10/1982 | Rodenbeck | 81/9.51 |
| 4,367,774 A | * | 1/1983 | Arnold et al. | 140/1 |
| 4,388,953 A | * | 6/1983 | Hara et al. | 140/149 |
| 4,528,741 A | | 7/1985 | Grimsby | |
| 4,869,135 A | * | 9/1989 | Hoffa | 81/9.51 |
| 4,951,530 A | * | 8/1990 | Cross | 81/9.51 |
| 5,333,521 A | * | 8/1994 | Dunsenko, Jr. et al. | 81/9.51 |

FOREIGN PATENT DOCUMENTS

| | | | | |
|---|---|---|---|---|
| JP | 55-130125 | * | 10/1980 | 29/564.4 |
| JP | 4325813 | * | 11/1992 | 29/564.4 |
| JP | 5-78122 | | 10/1993 | |
| JP | 11-98638 | * | 4/1999 | 29/564.4 |

* cited by examiner

Primary Examiner—William Briggs
(74) Attorney, Agent, or Firm—Christensen O'Connor Johnson Kindness PLLC (57) ABSTRACT

There is provided an apparatus for stripping insulation from a wire that comprises a cutter mechanism and a cutter holder for carrying the cutter mechanism. The cutter mechanism has opposite cutting edges that are movable relatively toward and away from one another other perpendicular to the length of the wire. The cutter holder is reciprocally movable along the length of said wire and revolvable about an axis that passes through the wire. The opposite cutting edges move toward to each other to cut into an insulation portion of the wire, followed by which the cutter holder revolves about said axis and moves away from an end of the wire to remove the insulation from the wire.

16 Claims, 12 Drawing Sheets vacuum or suction

APPARATUS FOR STRIPPING INSULATION FROM A WIRE

BACKGROUND OF THE INVENTION

This invention relates to an apparatus for stripping insulation from the end of an insulated wire.

A wire stripping apparatus having a pair of opposed blades is known. In a typical wire stripping apparatus, the blades are provided at each one end of pivotable arms so that opposed cutting edges of the blades are movable toward and away from one another. According to the apparatus comprising pivotable arms, a lengthwise space that accommodates the pivotable arms is required. This may results in a bulky apparatus.

In addition, with the construction having pivotable arms, the cutting edges are cut into insulation of a wire by swinging movement of the arms so that the blades move through an arc. This can lead to uneven tearing of insulation and skiving or nicking of a wire core during subsequent strip.

Figure 5A:
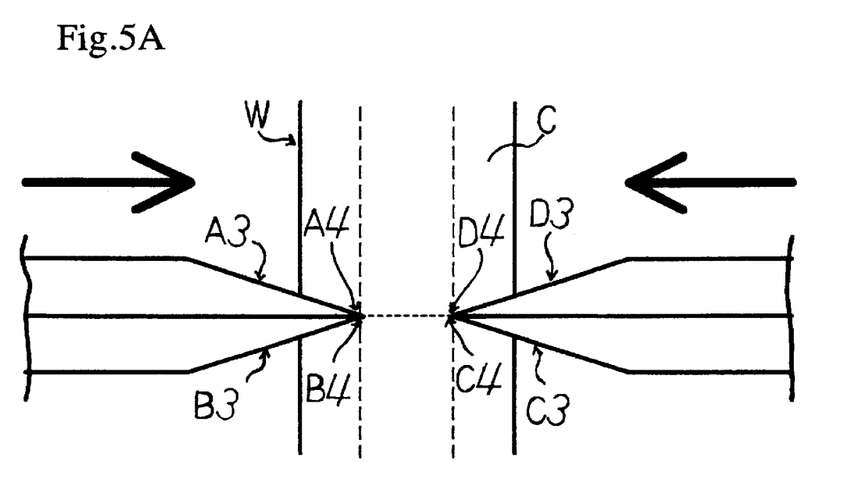
FIG. 5(A) shows a side view showing that the blades of the present invention are cut into the insulation of wire.
Figure 5B:
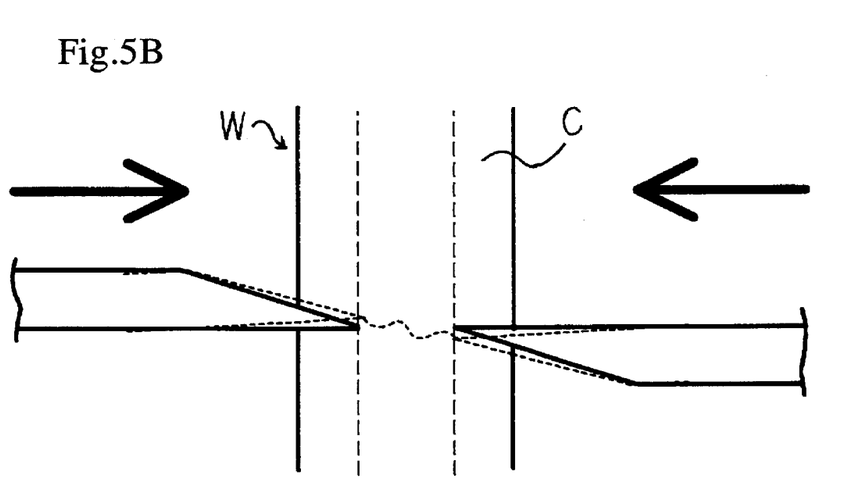
FIG. 5(B) shows a side view showing that the conventional V-shaped blades are cut into the insulation of wire.
Figure 6A:
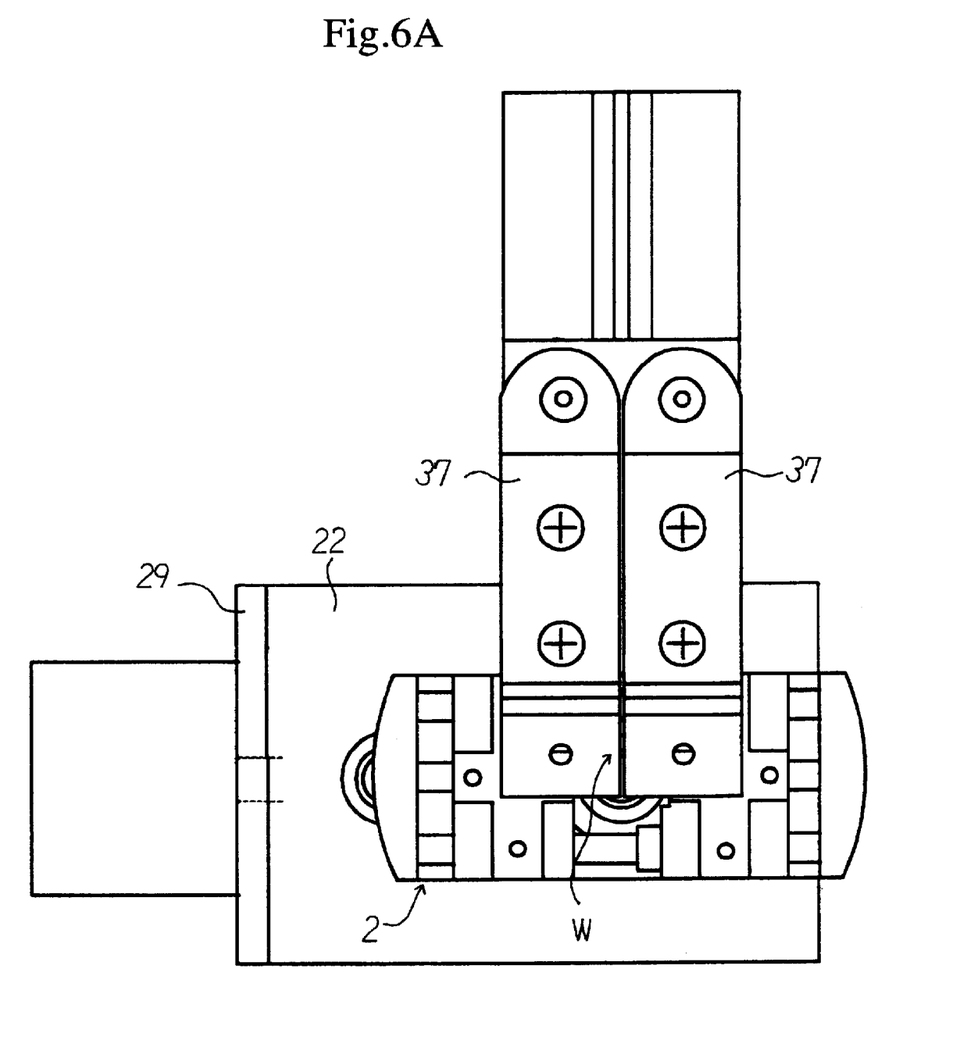
FIG. 6(A) is a plan view showing clamping arms clamping the wire.
Figure 6B:
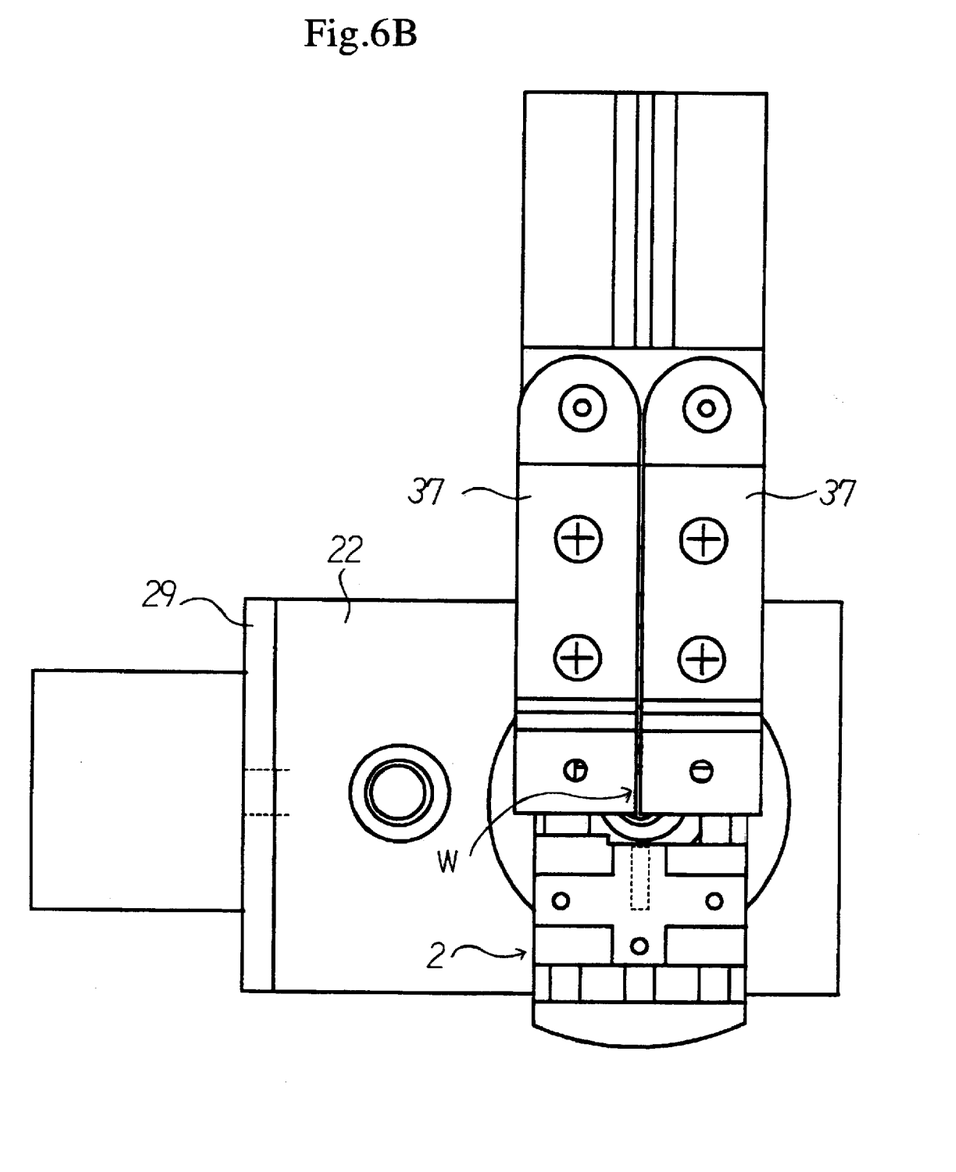
FIG. 6(B) is a plan view showing a revolving cutter holder while the clamping arms clamps a wire.
Figure 6C:
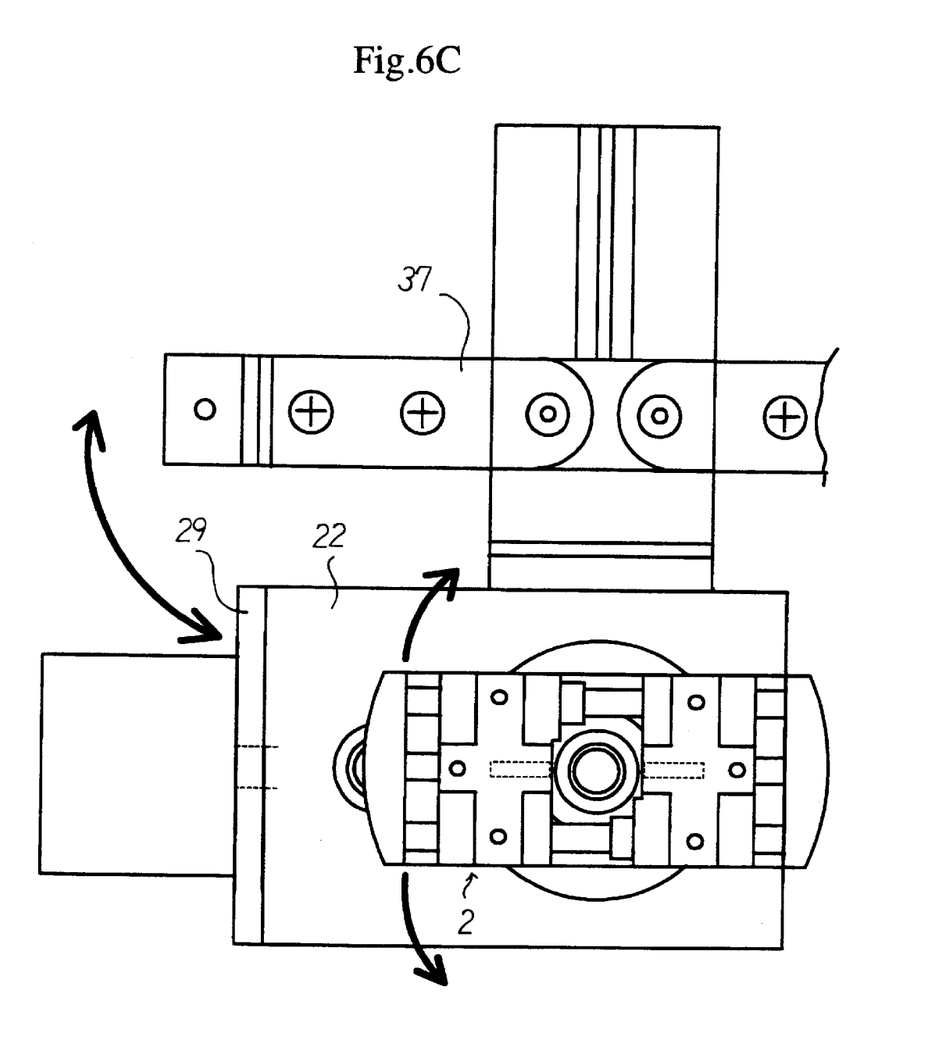
FIG. 6(C) is a plan view showing the clamping arms in its open position.
Figure 7A:
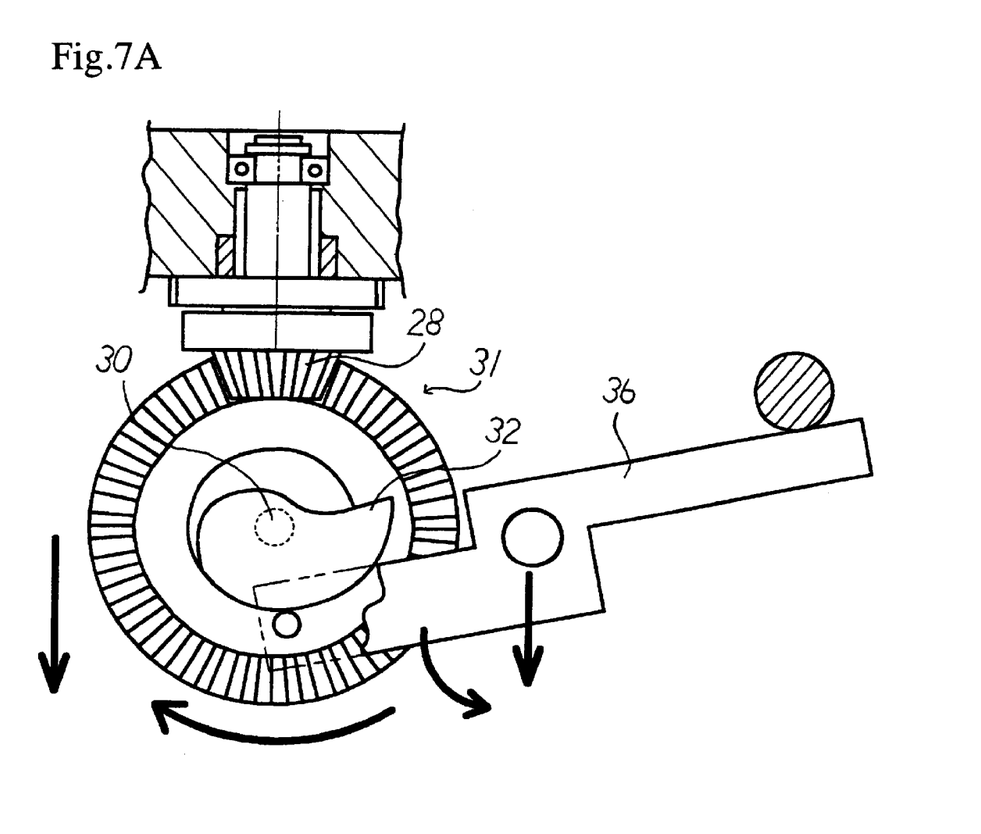
FIGS. 7(A) and 7(B) show an engagement between a cam and a lever.
Figure 7B:
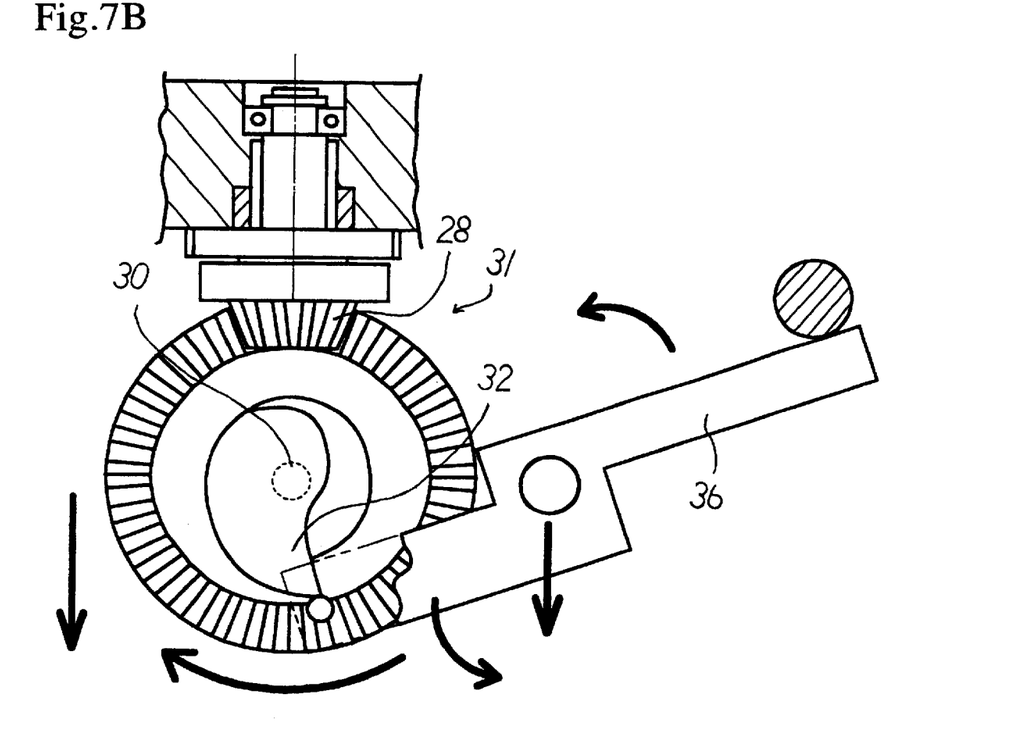

A typical stripping apparatus of the prior art comprises opposed V-shaped blades as shown in FIG. 5(B). With this configuration, the wire will skive or bent due to the unbalanced forces acting of the opposite sides of the wire. This and other disadvantages of the conventional V-shaped blades are described in U.S. Pat. No. 4,528,741 to Emerson, incorporated herein by reference. The problem that the stripping operation may result in damage to the wire core become acute as the diameter of the wire decreases, as extremely fine insulated wire is difficult to handle, and the thickness of the insulation becomes so small that damage to the core by the stripping tool becomes almost unavoidable.

Next, the stripped insulation removed from the wire end and cutting dust or cutting residue may cling to the cutting edges by an electrostatic force. Adhesion of the same to the cutting edges can lead to cutting or nicking of the wire core during the next stripping operation. In addition, if a number of the stripped insulation portions removed spread out on a floor, cleaning of the floor is required.

Next, the wire core is comprised of generally a bundle of multiple fine strands. Twist of the exposed strands may be required to prevent the bundle of strands from coming apart. Japanese utility model publication No. 5-78122 discloses means for twisting the wire core in which insulation is cut and remains about wire core without removing. The remain insulation is sandwiched between opposite friction plates, followed by moving the opposite plates toward opposite direction one another. In accordance with the disclosure, another means for twisting the wire core is required besides the stripping means.

From the foregoing, the present invention seeks to preclude above disadvantages.

An object of the present invention is to provide a compact stripping apparatus without pivotable arms.

Another object of the present invention is to provide accurate, reliable stripping apparatus that is capable of stripping insulation from a wire without damage to a wire core.

Another object of the present invention is to collect stripped insulation properly and to prevent cutting dust from clinging to cutting edges.

Another object of the present invention is to twist exposed strands during the stripping operation.

SUMMARY OF THE INVENTION

There is provided an apparatus for stripping insulation from a wire that comprises a cutter mechanism and a cutter holder for carrying the cutter mechanism. The cutter mechanism has opposite cutting edges that are movable relatively toward and away from one another other perpendicular to the length of the wire. The cutter holder is reciprocally movable along the length of said wire and revolvable about an axis that passes through the wire. The opposite cutting edges move toward to each other to cut into an insulation portion of the wire, followed by revolving the cutter holder about said axis and moving the cutter holder away from an end of the wire to remove the insulation from the wire.

According to the above construction, if a wire core is comprised of a bundle of multiple fine strands, the strands are twisted by the revolving and away movements of the cutter holder.

Advantageously, the apparatus further comprises collecting means for collecting stripped insulation removed from the wire end and cutting dust or residue that may cling to the cutting edges of blades. More preferably, the collecting means comprises an elongate hollow member extending in the length of the wire, more specifically in the axis that passes through the extending wire. One end of the member faces the end of the wire and the other end of the member communicates with vacuum or suction means so that the stripped insulation and dust or residue are positively and forcibly collected via the elongate member.

Advantageously, the cutter mechanism comprises opposed cutter means. One of opposed cutter means comprises a first and a second blades, and the other of opposed cutter means comprises a third and a fourth blades. Each blade has a flat surface on one side of said blade, and a beveled surface on the opposite side of the blade intersecting the flat surface to define the cutting edge, and the cutting edge extends at an angle across the blade. The cutting edge of the blades of each the cutter means form a V-shaped notch, the V-shaped notches of the pair of cutters face each other to form a wire receiving portion. The flat surfaces of the four blades lie generally in a common plane so that the cutting edges of four blades are arranged in the same plane. The beveled surfaces of the first and third blades are opposite to each other and both face in one direction relative to the plane. The beveled surfaces of the second and fourth blades are opposite to each other and both face in the opposite direction relative to the plane. The above construction of four blades is advantageously adapted for twisting the wire core comprising strands when removing the insulation.

BRIEF DESCRIPTION OF THE DRAWINGS

These and other objects and advantages of the invention, as well as the details of an illustrative embodiment, will be more fully understood from the following specification and drawings, in which.

DESCRIPTION OF THE PREFERRED EMBODIMENTS

Referring to FIGS. 1 through 3(B), a stripping apparatus comprises a cutter holder 2 on which a cutter mechanism 1 is mounted. The cutter holder 2 is revolvably mounted about an axis that passes through the vertically extending wire W so that the holder 2 horizontally revolves perpendicular to the length of a wire W. The holder 2 is reciprocally movably mounted in the vertical direction so that the holder 2 vertically moves up and down along the length of wire W. According to the illustrated embodiment, the wire W is supplied to the stripping apparatus in a vertically upstanding position, the holder 2 revolves horizontally and is reciprocally movable in the vertical direction. If the wire is laterally supplied to the apparatus in a horizontally extending position, the holder is vertically rotatably and is reciprocally movably mounted in a horizontal direction.

The holder 2 comprises a cylindrical portion 3, and a cutter mounting portion 4 that is integrally provided in an upper portion of the cylindrical portion 3. The cutter mounting portion 4 comprises a rectangular horizontal base plate 5 and a pair of side walls 6 that are oppositely upstanding at ends of the plate 5. A central portion of the plate 6 is provided with an aperture that communicates with a hollow portion of the cylindrical portion 3.

Two slide pins 7 that facilitate a straight sliding movement of two movable blocks 8 are mounted parallel to each other between the opposed side walls 6. Each block 8 has two openings for receiving the slide pins 7 therethrough so that the opposed two blocks B are slidably mounted along the length of the pins 7. The blocks 8 carry blades A, B, C, D, which constitute the cutter means 1.

A spring 9 is interposed between each block 8 and each side wall 6 so that the spring 9 applies urging force to the opposed each block 8 to move toward to each other. Each block 8 has an upstanding wall opposed to each other and a lower portion of the wall is tilted to away from one another. A cam follower 10 is mounted at the titled plane of the block 8. A movement of the block 8 toward to each other is regulated by contacting a stopper 11. The cam follower 10 normally is in contact with the tapered cam surface.

The stopper 11 has a tapered cam surface, a diameter of which is incrementally decreasing in an upper direction. The stopper 11 is reciprocally movable in the vertical direction. The upward movement of the stopper 11 effects the away movement of the opposite cutting edges while the downward movement of the stopper 11 effects the toward movement of the opposite cutting edges.

The cutter mechanism will be explained. An upper surface of the block 8 has a shallow recess portion 80 that extends in the length of the pin 7 and the recess portion receives the blades A, B, C, D that constitute the cutter means 1. Each blade is fixed in the recess portion by a blade clamper 12. One pair of blades A, B constitute one cutter means and the other pair of blades C, D constitute the other cutter means. The two cutter means 1 are oppositely mounted so that cutting edges A4, B4, C4, D4 of both cutter means 1 are opposed. Referring to FIGS. 5(A), 5(B), each blade A, B, C, D has a generally straight edge defined by a flat surface on one side A2, B2, C2, D2 (referred to as a first surface) of the blade A, B, C, D, and a beveled surface A3, B3, C3, D3 on the opposite side A1, B1, C1, D1 (referred to as a second surface) of the blade intersecting the flat surface to constitute the cutting edges A4, B4, C4, D4. Each cutting edge A4, B4, C4, D4 extends at an angle across the blade A, B, C, D. Specifically, each cutting edge A4, B4, C4, D4 extends at an angle of 45 degrees. The cutting edges A4, B4, C4, D4 of the blades of each cutter means form a V-shaped cutting edge, and the V-shaped cutting edges of the pair of cutter means face each other to form a wire receiving opening. The first surfaces A2, B2, C2, D2 of the four blades A, B, C, D lie substantially in a common plane so that the cutting edges A4, B4, C4, D4 are arranged in the same plane to each other. The beveled surfaces A3, D3 of the blade A and the blade D are opposite to each other and both face in one direction relative to the plane. The beveled surfaces B3, C3 of the blade B and blade C are opposite to each other and both face in the opposite direction relative to the plane.

When the opposite cutter means 1,1 move toward to each other, the blade A and blade B overlap the blade C and blade D respectively. The opposite blades of the two pairs of blades have equal facial surfaces engaging the insulation on the wire which assures equal forces will be applied to the wire when the insulation is removed therefrom thereby avoiding skiving of the wire, and leaving the stripped wire straight. These and other advantages of this configuration of four blades are disclosed in the Emerson patent, incorporated herein by reference. However, the above-described configuration of the blades is advantageously adapted for the rotating cutting edges. The Emerson patent fails to disclose this point.

The wire W normally consists of an insulative sheath C on a conductive core, and the latter is normally comprised of a bundle of multiple fine strands. According to the present invention, exposed strands are twisted when removing the insulation. This can be done due to the friction between the blades and the insulation, and the friction between an inner surface of the insulation and the wire core. More specifically, the orientation of the four beveled surfaces A3, B3, C3, D4 enables twisting the strands properly. In addition, the cutters moving toward to each other perpendicular to the length of wire are advantageously adapted for the twisting of the strands.

An elongate cylindrical hollow member or suction pipe 13 for collecting the stripped insulation is provided and extended in the hollow portion of the cylindrical portion 3. The member extends vertically and an upper part of the member 13 extends into the cutter mounting portion 4 such that an upper opening of the pipe is positioned just beneath the cutter means 1 and is faced the wire end. The stripped insulation is collected by suction. The stopper 11 is slidably mounted at the upper and outer surface of the member 13. The lower part of the member 13 extends downwardly from the lower end of the cylindrical portion 3. The member 13 extends in the axis that passes through the extending wire so that the member 13 does not prevent the revolving and vertical movements of the holder 2.

The stopper 11 is comprised of an upper tapered part constituting the cam surface and a lower cylindrical part. The lower part is positioned in the hollow portion of the cylindrical portion 3. The upper part is faced in a space that is defined between the opposed side walls 6.

A piston rod 14 is mounted between an inner surface of the cylindrical portion 3 and an outer surface of the collecting member 13. An upper end of the piston rod 14 contacts a lower end of the stopper 11. When the piston rod 14 moves up and down about the length of the member 13, the stopper 11 also moves up and down. The upward and downward movements of the stopper 11 effect the relative toward and away movements of the cutting edges through the cam surface and the cam follower.

A relatively shorter cylindrical body 15 is provided at a lower part of the cylindrical portion 3. The cylindrical body 15 is detachably connected to the lower portion of the cylindrical portion 3. A spring 16 is provided between the piston rod 14 and an upper end surface of the body 15. The piston rod 14 is upwardly biased by the spring 16. With this configuration, the member 13 also constitutes a guide supporter for the piston rod 14.

An air chamber 18 is provided between the cylindrical portion 3 and the piston rod 14. The air chamber is defined by spaced apart two O-rings 17 that are provided in a space between the cylindrical portion 3 and the piston rod 14. The piston rod 14 is forcibly downwardly moved against the spring force by injecting an air into the air chamber 18.

The up and down movements of the piston rod 14 may be obtained by another construction. The piston rod 14 may be moved upwardly by injecting an air into an air chamber. The downward movement of the piston rod 14 may be made by a relatively strong spring force that moves the opposite blocks toward to each other. With this construction, the spring 16 can be eliminated. It is also appreciated by those skilled in the art that at least one movement in one direction of the piston rod may be obtained by actuating means such as an air, a spring, and an electric motor, alone and in any combination thereof.

An adjustment screw 19 is provided inside the body 15. The body 15 has two opposed openings (not shown) in a cylindrical wall so that the screw 19 is exposed to be handled from outside. A lower portion of the screw 19 is rotatably threaded to a screw nut 20 so that the screw 19 is vertically movable relative to the nut 20 that is immovable in the vertical direction. The slightly upward and downward movements of the screw 19 effect the fine positioning of the stopper 11.

A dust nozzle 21 is rotatably connected at the lower end of the nut 20. The dust nozzle is in communication with a vacuum hose not shown. The elongate member 13 and the vacuum hose communicate with vacuum or suction means such that they are always under suction. The aspirating operation may be done continuously regardless of the stripping operation or intermittently in accordance with the stripping operation. When the holder 2 revolves, the stopper 11, the body 15 and the nut 20 revolve together. The piston rod 14 is free from the revolving action of the holder 2. The dust nozzle 21 is rotatably mounted such that a twist of the vacuum hose is prevented.

The cylindrical portion 3 of the holder 2 is rotatably mounted in a substantially rectangular parallelepiped housing 22. The housing 22 are provided with two relatively larger and smaller openings 22a, 22b that vertically extend through the body of the housing 22. The cylindrical portion 3 of the holder 2 is rotatably mounted in the opening 22a via a bearing. A lower portion of the cylindrical portion 3 is downwardly extended from a lower surface of the housing 22 and a spindle gear 23 is provided on the extended portion of the cylindrical portion 3.

An air supply path 24 that is extended to the opening 22a is provided in a cylindrical side wall of the housing 22. The air supply path 24 is in fluid communication with an air inject aperture 25 that is provided in a wall of cylindrical portion 3. With this configuration, a ring-like air chamber 180 is provided between the outer wall of the cylindrical portion 3 and the wall of the opening 22a. The air chamber 18 and the air chamber 180 communicate to each other via the air inject aperture 25. An air introduced from the air supply path 24 is supplied to the air chamber 18.

A twist shaft 26 is rotatably mounted in the opening 22b of the housing 22. A clutch gear 27 is operatively connected to the twist shaft 26 via a one-way clutch. The clutch gear 27 and the spindle gear 23 are operatively connected to each other. A lower portion of the twist shaft 26 is extended from the lower surface of the housing 22 and a clutch-beveled gear 28 is provided on the extended portion of the shaft 26. The beveled gear 28 is supported by a support 280.

One side wall of the housing 22 is fixed to an upper portion of a vertically upstanding plate-like base 29. A horizontally extending shaft 30 is extended through a lower portion of the base 29 and an actuating beveled gear 31 is provided on the shaft 30. The beveled gear 28 and the beveled gear 31 are operatively connected. A cam 32 that will be explained hereinafter is mounted at an end of the shaft 30. It is appreciated by those skilled in the art that other means for supporting and rotating the cutter holder is readily adapted. For example, the beveled gears 28 and 31 may be replaced by a pinion gear and rack teeth respectively. The spindle gear 23 may be directly driven by an electric motor.

Figure 1:
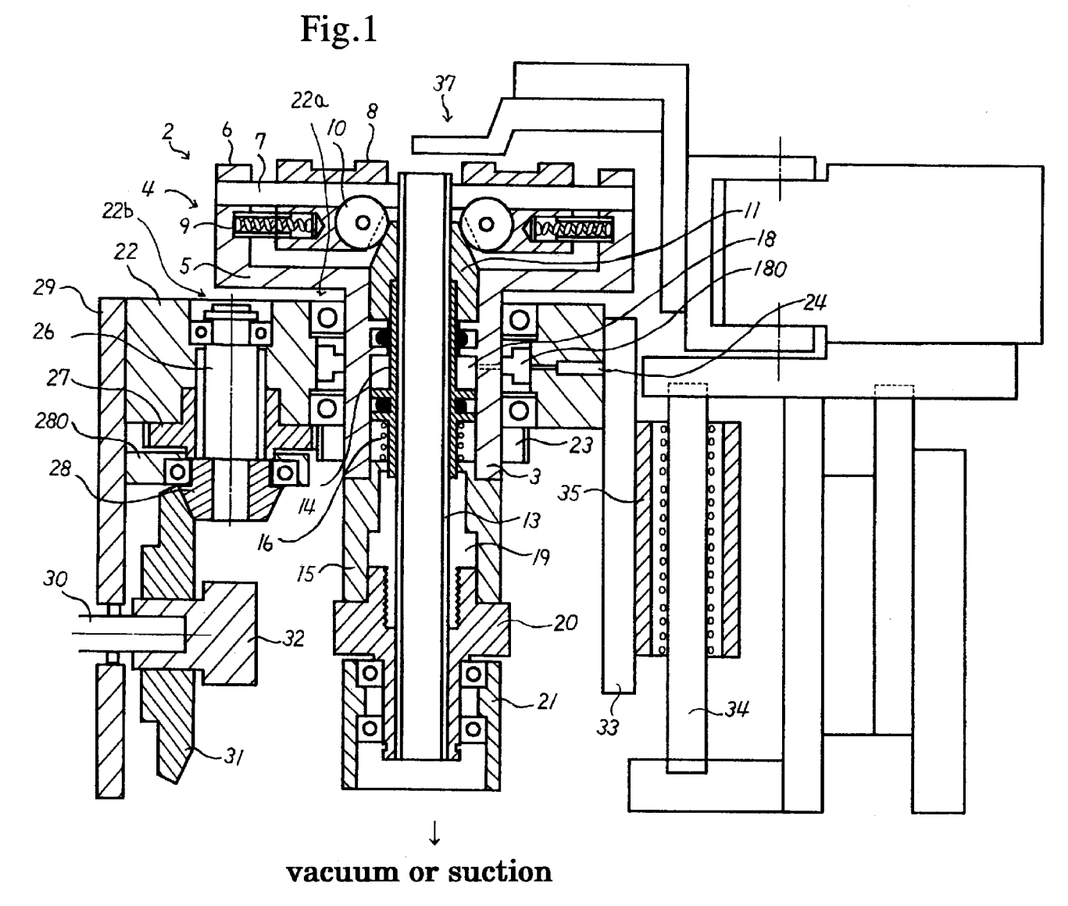
FIG. 1 shows a cross-sectional view of a wire stripping apparatus showing a cutter holder in which a vertically slide unit is conveniently developed to the right of the drawing.
Figure 2:
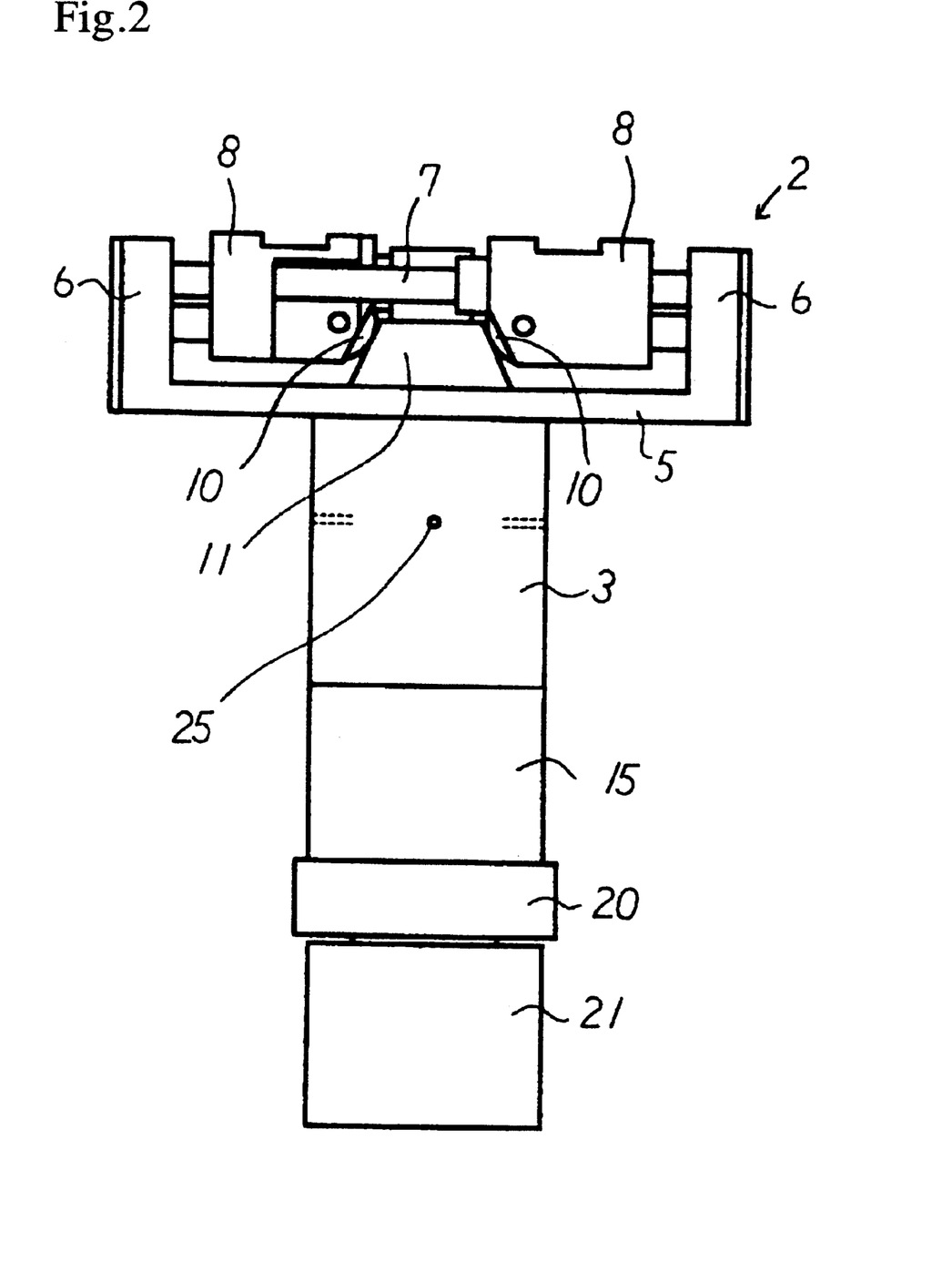
FIG. 2 is a front view of the cutter holder in which an opening of a shorter cylindrical body is omitted.
Figure 3A:
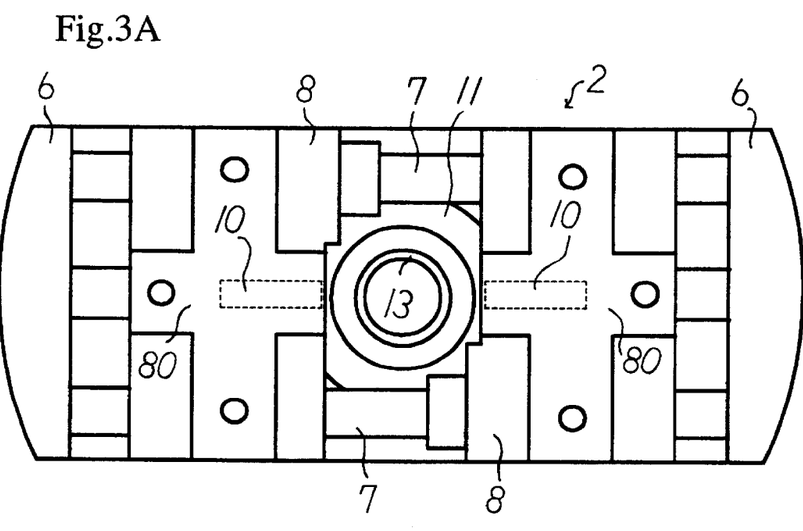
FIG. 3(A) is a plan view of the cutter holder without cutters.
Figure 3B:
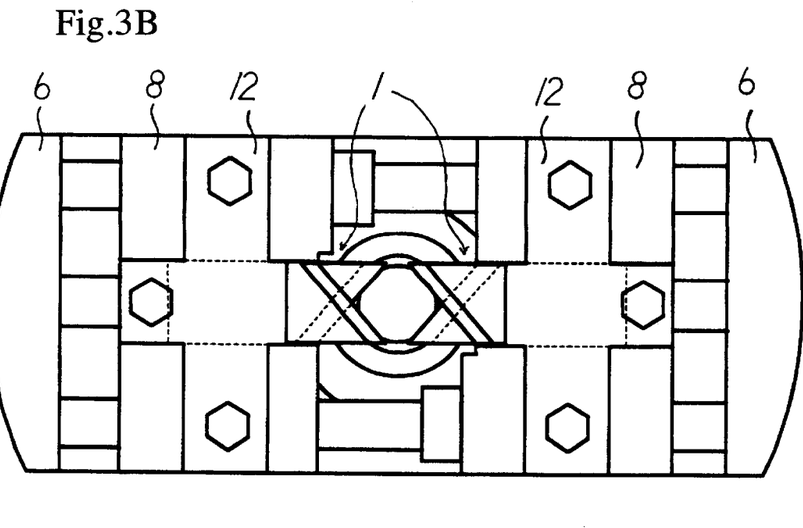
FIG. 3(B) is a plan view of the cutter holder on which the cutters are mounted.
Figure 4A:
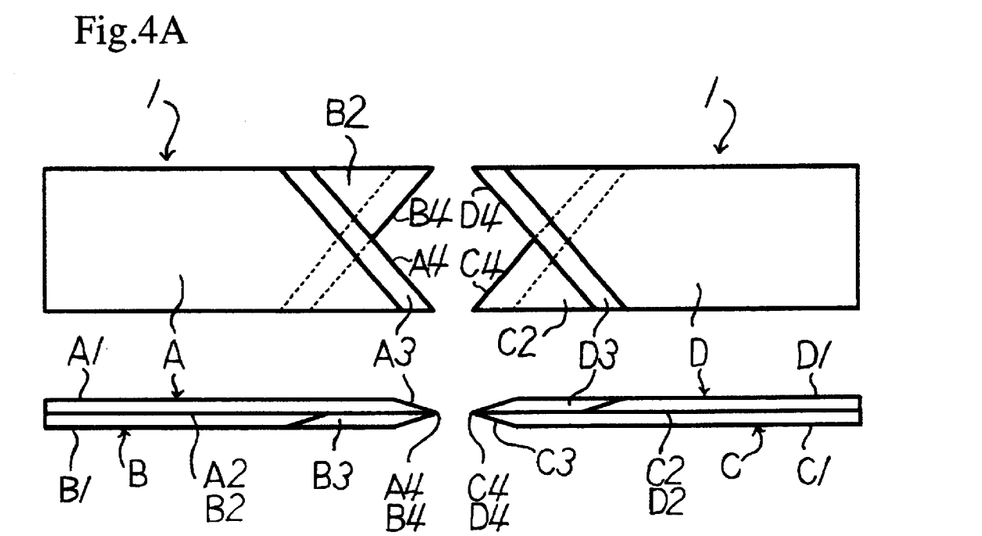
FIG. 4(A) shows a plan view of cutter means and a side view thereof.
Figure 4B:
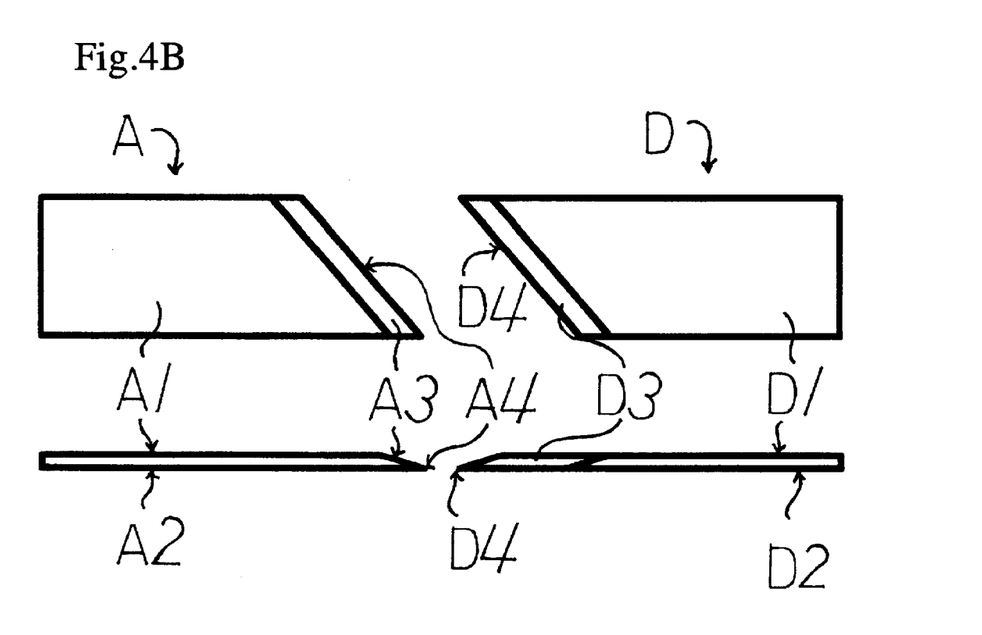
FIG. 4(B) shows a plan view of one opposite blades and a side view thereof.

Another side wall of the housing 22 adjacent the above one side wall is fixed to an upper portion of a vertically upstanding plate 33 that is connected to a sliding unit. Referring to FIG. 1, the plate 33 is developed to the right for a convenient reason. Actually, the plate 33 extends neighboring and perpendicular to the base 29. The sliding unit comprises two vertically upstanding slide shafts 34 (only one shaft is shown in the figure) and a slider 35 that is slidably mounted along the length of the shafts 34 via a bearing. The slider 35 is normally upwardly biased by a force of spring not shown. A wire stripping unit comprising the holder 2 is vertically reciprocally movable in accordance with the up and down movements of the slider 35. It is appreciated by those skilled in the art that other means for vertically reciprocal movement of the holder 2 is readily adapted.

A lever 36 is pivotally mounted at a separate plate such as a plate for supporting the vertically sliding unit. The cam 32 engages the lever 36. The cam 32 is comprised of a known eccentric plate cam. A circumference of the plate cam 32 consists of an outer cam surface and a cutout edge opposite to the cam surface. The end of the shaft 30 is connected to the center portion of the cam 32 so that the cam 32 rotates in accordance with the rotation of the shaft 30.

When the cam 32 rotates, the outer cam surface of the cam 32 rotates by constantly contacting the lever 36 provided on the plate so that the stripping unit moves downwardly against the spring force. When the cam surface of the cam 32 disengages the lever 36, the stripping unit moves upwardly by the spring force. The position of the lever 36 relative to the plate is selectively variable so that displacement amount of the downward movement of the holder 2 is selected. According to the embodiment, the revolving speed of the holder 2 is constant so that a degree of twist of strands can be selected by selecting the downward movement of the holder 2. It is appreciated by those skilled in the art that other means for vertically reciprocally moving the cutter holder is readily adapted. For example, the cutter holder 2(housing 22) may be vertically reciprocated by an electric motor or air cylinder.

Figure 8A:
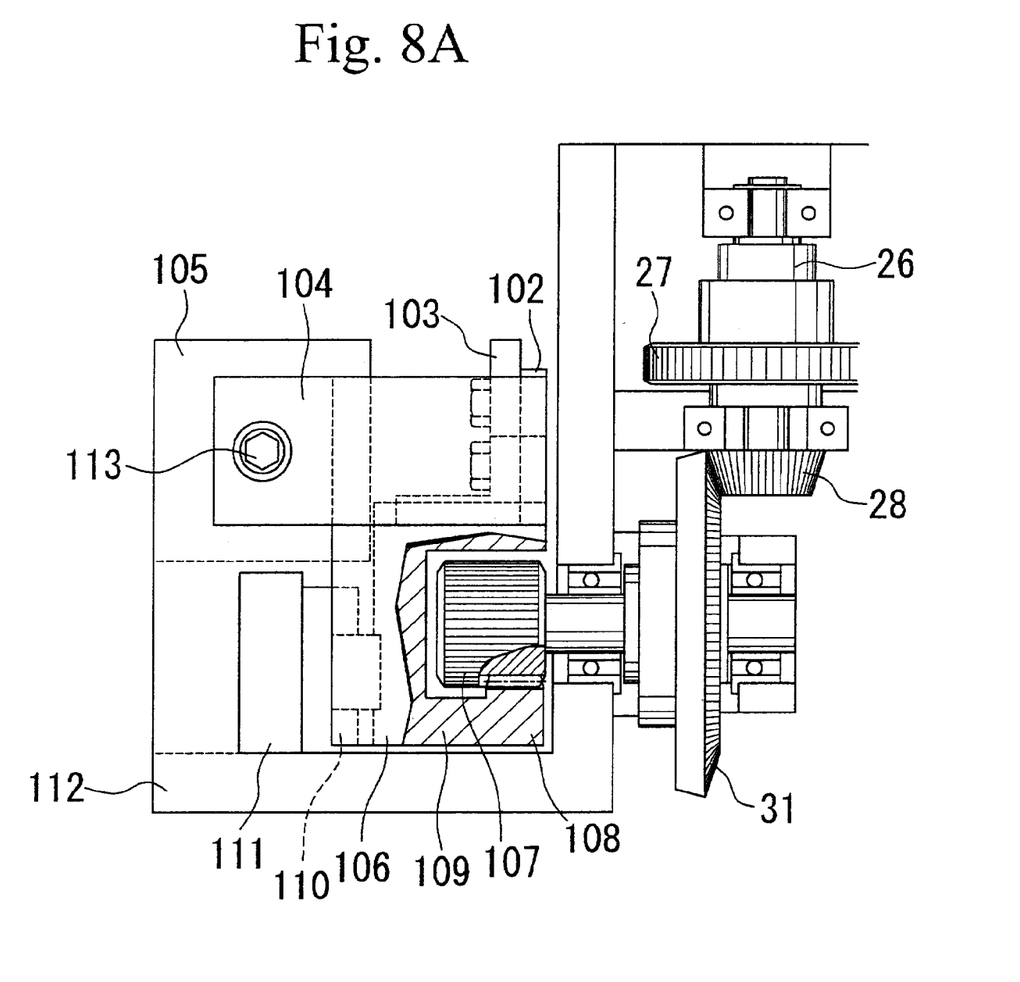
FIGS. 8(A) and 8(B) show another embodiment of revolving and vertically movable mechanism of the cutter holder.
Figure 8B:
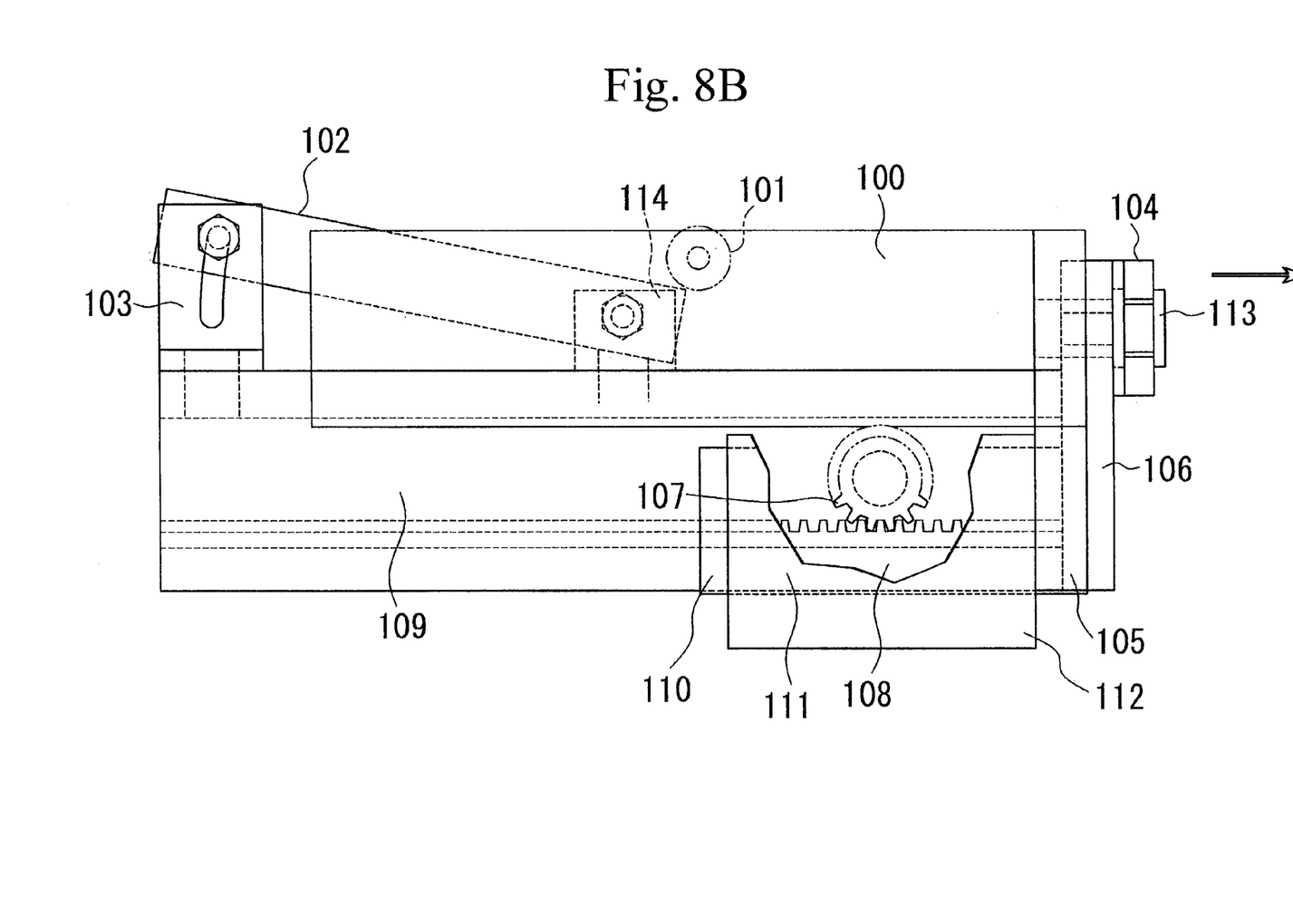

Referring to FIGS. 8(A), 8(B), another mechanism for revolving and downwardly moving the cutter holder 2 comprises a linear cylinder 100, a cam follower 101, a slide cam 102, a first cam stay 103, a cylinder joint stay 104, a cylinder fixing plate 105, a rack frame stay 106, a pinion gear 107, a rack 108, a rack frame 109, a linear guide for sliding rack frame 110, a linear guide fixing plate 111, a fixing frame 112, a cylinder joint 113, and a second cam stay 114. The cylinder fixingplate 105, the fixing frame 112, and the linear guide fixing plate 111 are fixed together by screws. The rack 108, the rack frame 109, the rack frame stay 106, the first and second cam stays 103, 114 are fixed together so that they are moved in the direction of an arrow by the liner movement of cylinder 100. The cam follower 101 is fixed to a separate body such as a plate for supporting the vertically sliding unit. When the rack 108 moves, the pinion gear 107 is rotated thereby revolving the cutter holder 22. The slide cam 102 is fixed to the first and second cam stays 103, 114 and the position of the cam follower 101 is fixed so that the cam 102 is guided by the cam follower 101 thereby moving the housing downwardly.

The stripping apparatus of the present invention may constitute one station of a wire treating device. The wire treating device may comprise a station for uncoiling the wire, a station for obtaining a short wire of predetermined length, a station for stripping insulation, and a station for soldering the wire. The short wire W is clamped by clamping arms 37 at its central portion in the length thereof. The vertically extending wire W is introduced to the spaced defined between the opposite cutter means 1.

The piston rod 14 is downwardly moved by an air that is injected into the air chamber 18. The opposite cutting edges A4, B4, C4, D4 move toward to each other to cut into the insulation C of the wire W. The shaft 30 is rotated by an actuator such as an electric motor not shown so that the holder 2 rotates through the beveled gears 31, 28, the shaft 26, the gears 27, 23.

The cutting edges A4, B4, C4, D4 in the insulation rotate at a predetermined angle (90 degrees for example). Then, the holder 2 moves downwardly away from the end of the wire while keep revolving. The twist of the strands and removing of the insulation are made at the same time.

The downward movement of the holder 2 is made by the cam 32. When the shaft 30 rotates, the rotating cam 32 moves the stripping unit comprising the holder 2 downwardly against the spring through the lever 36 engaging the cam 32. When the cam 32 rotates to moves the holder 2 downwardly at a predetermined amount, the cam 32 disengages the lever 36 so that the stripping unit moves upwardly by the spring.

Next, the air in the air chamber 18 is removed so that the piston rod 14 moves upwardly by the spring 16 and the opposite blades moves away from one another. The wire having stripped end portion and is clamped by the clamping arms 37 is conveyed to the subsequent station.

What is claimed is:

1. An apparatus for stripping insulation from a wire comprising:
    (a) a cutter mechanism having opposite cutting edges defining a wire receiving portion therebetween, said opposite cutting edges being movable toward and away from one another perpendicular to the length of the wire;
    (b) a cutter holder for carrying said cutter mechanism, said holder having means for reciprocally moving said holder along the length of said wire and said holder further having means for revolving said holder about and axis that passes through said wire such that said opposite cutting edges move toward each other to cut into the insulation of said wire, followed by revolving said cutter holder about said axis and moving said cutter holder away from an end of said wire to strip the insulation from said wire; wherein,
    (c) said cutter holder comprises a pair of opposed movable blocks that are movable toward and away from one another perpendicular to the length of the wire; and
    (d) said cutter mechanism comprise a pair of cutting means that are mounted on said blocks; and further wherein,
    (e) said cutter holder comprises a cylindrical portion and a cutter mounting portion integrally provided at one end of the cylindrical portion extending in the length of the wire;
    (f) said cutter mounting portion comprises a rectangular base plate extending perpendicular to the length of the wire and opposite side walls provided at the ends of the rectangular base plate;
    (g) said cutter holder comprises at least one slide pin that is mounted between said opposite side walls; and
    (h) said movable blocks are slidably mounted on said at least one slide pin.

2. An apparatus for stripping insulation from a wire comprising:
    (a) a cutter mechanism having opposite cutting edges defining a wire receiving portion therebetween, said opposite cutting edges being movable toward and away from one another perpendicular to the length of the wire;
    (b) a cutter holder for carrying said cutter mechanism, said holder having means for reciprocally moving said holder along the length of said wire and said holder further having means for revolving said holder about and axis that passes through said wire such that said opposite cutting edges move toward each other to cut into the insulation of said wire, followed by revolving said cutter holder about said axis and moving said cutter holder away from an end of said wire to strip the insulation from said wire;
    (c) collecting means comprising an elongate hollow member extending along said axis for collecting stripped insulation removed from said wire and cutting dust that may cling to the cutting edges; wherein,
    (d) one end of said member faces the end of the wire; and
    (e) the other end of said member communicates with suction means; and further wherein,
    (f) said cutter holder further comprises a cylindrical portion and a cutter mounting portion integrally provided at one end of the cylindrical portion, the cylindrical portion extending in the direction of the length of the wire and opposite side walls provided at the ends of the plate;
    (g) said cutter mounting part comprises a rectangular base plate extending perpendicular to the length of the wire and opposite side wall provided at the end of the plate;
    (h) said plate comprises an aperture in its central portion, said aperture communicates with a hollow portion of said cylindrical portion; and
    (i) said elongate hollow member extends into the hollow portion of the cylindrical portion and through said aperture.

3. The apparatus as claimed in claim 2, wherein:
   said vacuum means is rotatably connected to the other end of the cylindrical portion.

4. An apparatus for stripping insulation from a wire comprising:
    (a) a cutter mechanism having opposite cutting edges defining a wire receiving portion therebetween, said opposite cutting edges being movable toward and away from one another perpendicular to the length of the wire;
    (b) a cutter holder for carrying said cutter mechanism, said holder having means for reciprocally moving said holder along the length of said wire and said holder further having means for revolving said holder about and axis that passes through said wire such that said opposite cutting edges move toward each other to cut into the insulation of said wire, followed by revolving said cutter holder about said axis and moving said cutter holder away from an end of said wire to strip the insulation from said wire; wherein, (c) said cutter holder comprises a pair of opposed movable blocks that are movable toward and away from one another perpendicular to the length of the wire;

(d) said cutter mechanism comprises a pair of cutting means that are mounted on said blocks;

(e) a stopper having a tapered cam surface and being reciprocally movable in the length of the wire; and (f) a cam follower being provided at each of the movable blocks to contact said tapered cam surface.

5. The apparatus as claimed in claim 4, wherein:
said opposite blocks are biased to move toward to each other.

6. The apparatus as claimed in claim 4, (a) each of the toward and away movement of the cutter means is effected by the reciprocal movement of the stopper; and (b) at least one movement in one direction of the stopper is effected by actuating means selecting from the group consisting of an air, a spring, an electric motor, alone and in any combination thereof.

7. The apparatus as claimed in claim 5, wherein:

(a) the toward movement of the cutting means is effected by biasing force; and (b) the away movement of the cutting means is obtained by actuating means selecting from the group consisting of an air, a spring, an electric motor, alone and in any combination thereof.

8. The apparatus as claimed in claim 4, wherein:
a cutting depth of the insulation is adjustable by selecting the position of the cam surface.

9. The apparatus as claimed in claim 1, said apparatus comprising:

(a) a stopper having a tapered cam surface and being reciprocally movable in the length of the wire;

(b) a cam follower being provided at each of the movable blocks to contact said tapered cam surface;

(c) an aperture being provided in the central portion of the base plate, said aperture communicating with a hollow portion of said cylindrical portion; and (d) a piston rod being reciprocally movably provided in the hollow portion of the cylindrical portion, and said piston is provided with the stopper in one end thereof.

10. The apparatus as claimed in claim 2, said apparatus comprising:

(a) a stopper having a tapered cam surface and being reciprocally movable in the length of the wire;

(b) a cam follower being provided at each of the movable blocks to contact said tapered cam surface;

(c) an aperture being provided in the central portion of the base plate, and said aperture communicating with a hollow portion of said cylindrical portion; and (d) a piston rod being reciprocally movably provided between an inner surface of the cylindrical part and an outer surface of the elongate member provided in the hollow portion of the cylindrical portion, and said piston rod is provided with the stopper in one end thereof.

11. The apparatus as claimed in claim 9, wherein:

(a) at least one air chamber is provided between the piston rod and the inner surface of the cylindrical portion; and (b) at least one air supplying path is provided through a wall of cylindrical portion such that at least one movement in one direction of the opposed cutting edges is obtained by an air force.

12. The apparatus as claimed in claim 10, wherein:

(a) at least one air chamber is provided between the piston rod and the inner surface of the cylindrical portion; and (b) at least one air supplying path is provided through a wall of cylindrical portion such that at least one movement in one direction of the opposed cutting edges is obtained by an air force.

13. An apparatus for stripping insulation from a wire comprising:

(a) a cutter mechanism having opposite cutting edges defining a wire receiving portion therebetween, said opposite cutting edges being movable toward and away from one another perpendicular to the length of the wire;

(b) a cutter holder for carrying said cutter mechanism, said holder having means for reciprocally moving said holder along the length of said wire and said holder further having means for revolving said holder about and axis that passes through said wire such that said opposite cutting edges move toward each other to cut into the insulation of said wire, followed by revolving said cutter holder about said axis and moving said cutter holder away from an end of said wire to strip the insulation from said wire;

(c) said cutter mechanism comprises opposite cutter means;

(d) one of opposite cutter means comprises a first and a second blades, and the other of opposite cutter means comprises a third and a fourth blades;

(e) each said blade has a flat surface on one side of said blade, and a beveled surface on the opposite side of the blade intersecting said flat surface to constitute the cutting edge, said cutting edge extending at an angle across said blade;

(f) the cutting edge of said blades of each said cutter means form a V-shaped cutting edge, the V-shaped cutting edges of said pair of cutter means face each other to form the wire receiving portion;

(g) said cutting edges lie generally in a common plane;

(h) the beveled surfaces of said first and third blades are opposite to each other and both face in one direction relative to said plane; and (i) the beveled surfaces of said second and fourth blades are opposite to each other and both face in the opposite direction relative to said plane.

14. The apparatus as claimed in claim 13, wherein:
said opposite cutter means are movable toward and away from one another perpendicular to the length of the wire.

15. The apparatus as claimed in claim 13, wherein:

(a) a wire core is comprised of a bundle of multiple fine strands; and (b) said strands are twisted by the revolving and away movements of the cutter holder.

16. The apparatus as claimed in claim 15, wherein:

(a) a wire core of said wire is comprised of a bundle of multiple fine strands; and (b) a control means whereby a degree of twist of said strands is selectively determined by a displacement amount of the away movement of the holder.

* * * * *

UNITED STATES PATENT AND TRADEMARK OFFICE
CERTIFICATE OF CORRECTION

PATENT NO. : 6,370,759 B1
DATED : April 16, 2002
INVENTOR(S) : T. Shimizu

It is certified that error appears in the above-identified patent and that said Letters Patent is hereby corrected as shown below:

<u>Title page,</u>
Item [57], ABSTRACT,
Line 5, "another other perpendicular" should read -- another perpendicular --
Line 9, "toward to each" should read -- toward each --

<u>Column 7,</u>
Line 62, "and axis" should read -- an axis --

<u>Column 8,</u>
Line 4, "mechanism comprise" should read -- mechanism comprises --
Line 29, "and axis" should read -- an axis --

<u>Column 9,</u>
Line 3, "and axis" should read -- an axis --
Line 19, "toward to each" should read -- toward each --
Line 21, after "claim 4," insert -- wherein: --

<u>Column 10,</u>
Line 2, "wall of cylindrical" should read -- wall of the cylindrical --
Line 9, "wall of cylindrical" should read -- wall of the cylindrical --
Line 24, "and axis" should read -- an axis --
Line 32, "one of opposite" should read -- one of said opposite --
Line 32, "a first and a" should read -- first and --
Line 34, "a third and a" should read -- third and --
Line 41, "means form" should read -- means forms --

Signed and Sealed this

Third Day of December, 2002

JAMES E. ROGAN
*Director of the United States Patent and Trademark Office*